US012689939B2

(12) United States Patent
Yanakiev et al.

(10) Patent No.: US 12,689,939 B2
(45) Date of Patent: Jul. 21, 2026

(54) BUFFER SIZE SIGNALING

(71) Applicant: Nokia Technologies Oy, Espoo (FI)

(72) Inventors: Boyan Yanakiev, Aalborg (DK); Carlos Santiago Morejon Garcia, Aalborg (DK); Benoist Pierre Sebire, Tokyo (JP); Abolfazl Amiri, Aalborg (DK); Klaus Ingemann Pedersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 289 days.

(21) Appl. No.: 18/623,422

(22) Filed: Apr. 1, 2024

(65) Prior Publication Data

US 2024/0340690 A1 Oct. 10, 2024

(30) Foreign Application Priority Data

Apr. 5, 2023 (FI) ...................................... 20235396

(51) Int. Cl.
H04W 28/00 (2009.01)
H04W 28/02 (2009.01)

(52) U.S. Cl.
CPC ............................... H04W 28/0278 (2013.01)

(58) Field of Classification Search
None
See application file for complete search history.

(56) References Cited

U.S. PATENT DOCUMENTS

| | | | |
|---|---|---|---|
| 2013/0295916 A1* | 11/2013 | Shahid | H04J 13/16 |
| | | | 455/422.1 |
| 2019/0150025 A1* | 5/2019 | Ohta | H04W 88/08 |
| | | | 370/329 |
| 2020/0275308 A1* | 8/2020 | Liu | H04W 72/21 |
| 2022/0182979 A1* | 6/2022 | Freda | H04W 72/12 |
| 2023/0209638 A1* | 6/2023 | Zhang | H04W 76/23 |
| | | | 370/329 |
| 2024/0114380 A1* | 4/2024 | Cheng | H04W 28/0236 |
| 2024/0147300 A1* | 5/2024 | Esswie | H04W 28/0278 |
| 2025/0071606 A1* | 2/2025 | Pradas | H04W 72/21 |
| 2025/0392949 A1* | 12/2025 | Xu | H04W 28/0278 |

FOREIGN PATENT DOCUMENTS

| | | | |
|---|---|---|---|
| CN | 102291772 A | 12/2011 | |
| CN | 114867063 B * | 11/2025 | ............ H04W 28/14 |
| EP | 2566274 A1 | 3/2013 | |
| WO | 2019/062461 A1 | 4/2019 | |
| WO | 2022/025815 A1 | 2/2022 | |
| WO | 2023/047335 A1 | 3/2023 | |
| WO | 2024/072390 A1 | 4/2024 | |

OTHER PUBLICATIONS

"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.

(Continued)

*Primary Examiner* — Brandon M Renner
(74) *Attorney, Agent, or Firm* — Barta Jones, PLLC

(57) ABSTRACT

Methods, apparatus and systems for signaling buffer sizes in a communication network are disclosed.

20 Claims, 8 Drawing Sheets

(56)　　　　　　References Cited

OTHER PUBLICATIONS

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"3rd Generation Partnership Project; Technical Specification Group Radio Access Network; Study on XR (Extended Reality) Evaluations for NR (Release 17)", 3GPP TR 38.838, V17.0.0, Dec. 2021, pp. 1-272.

"BS Tables for XR", 3GPP TSG-RAN WG2 Meeting #120, R2-2211600, Agenda: 8.5.4.1, Nokia, Nov. 14-18, 2022, 6 pages.

"Capacity improvements for XR services", 3GPP TSG-RAN WG2 Meeting #121, R2-2300189, Agenda: 8.5.4, Qualcomm Incorporated, Feb. 27-Mar. 4, 2023, pp. 1-7.

"Discussion on XR-specific capacity improvements", 3GPP TSG-RAN WG2 Meeting #121, R2-2301507, Agenda: 8.5.4, Ericsson, Feb. 27-Mar. 3, 2023, pp. 1-6.

"Discussion on MAC enhancement for XR-specific capacity improvement", 3GPP TSG-RAN WG2 Meeting #121, R2-2301721, Agenda: 8.5.4, Huawei, Feb. 27-Mar. 3, 2023, 6 pages.

"The Issues of XR-specific Capacity Improvements", 3GPP TSG-RAN WG2 Meeting #121, R2-2300227, Agenda: 8.5.4, CATT, Feb. 27-Mar. 3, 2023, pp. 1-6.

"Enhancements to Buffer Status Reporting for XR Traffic", 3GPP TSG RAN WG2 Meeting #121, R2-2300433, Agenda: 8.5.4, Intel Corporation, Feb. 27-Mar. 3, 2023, 7 pages.

"Discussion on BSR enhancements for XR", 3GPP TSG RAN WG2 Meeting #121, R2-2301773, Agenda: 8.5.4, Samsung, Feb. 27-Mar. 3, 2023, 4 pages.

"BSR enhancements for XR", 3GPP TSG RAN WG2 Meeting #121, R2-2300560, Agenda: 8.5.4, ZTE Corporation, Feb. 27-Mar. 3, 2023, 3 pages.

"Dynamic BSR formulation and reporting for XR", 3GPP TSG RAN WG2 Meeting #121, R2-2300256, Agenda: 8.5.4, Dell Technologies, Feb. 27-Mar. 3, 2023, 8 pages.

"XR-specific capacity improvements", 3GPP TSG-RAN WG2 Meeting #121, R2-2300696, Agenda: 8.5.4, InterDigital Inc, Feb. 27-Mar. 3, 2023, pp. 1-4.

"New WID on XR Enhancements for NR", 3GPP TSG RAN Meeting #98-e, RP-223502, Agenda: 9.1.2, Nokia, Dec. 12-16, 2022, pp. 1-5.

"Capacity enhancement for XR", 3GPP TSG-RAN WG2#121, R2-2301423, Agenda: 8.5.4, MediaTek Inc, Feb. 27-Mar. 3, 2023, 4 pages.

"3rd Generation Partnership Project; Technical Specification Group Services and System Aspects; System architecture for the 5G System (5GS); Stage 2 (Release 18)", 3GPP TS 23.501, V18.0.0, Dec. 2022, pp. 1-593.

"3rd Generation Partnership Project; Technical Specification Group Core Network and Terminals; Non-Access-Stratum (NAS) protocol for 5G System (5GS); Stage 3; (Release 18)", 3GPP TS 24.501, V18.1.0, Dec. 2022, pp. 1-1031.

Office Action received for corresponding Finnish Patent Application No. 20235396, dated Nov. 6, 2023, 18 pages.

"3rd Generation Partnership Project; Technical Specification Group Radio Access Network; NR; Study on XR enhancements for NR (Release 18)", 3GPP TR 38.835, V18.0.0, Mar. 2023, pp. 1-122.

Extended European Search Report received for corresponding European Patent Application No. 24165139.7, dated Jul. 5, 2024, 8 pages.

* cited by examiner

Figure 1A:
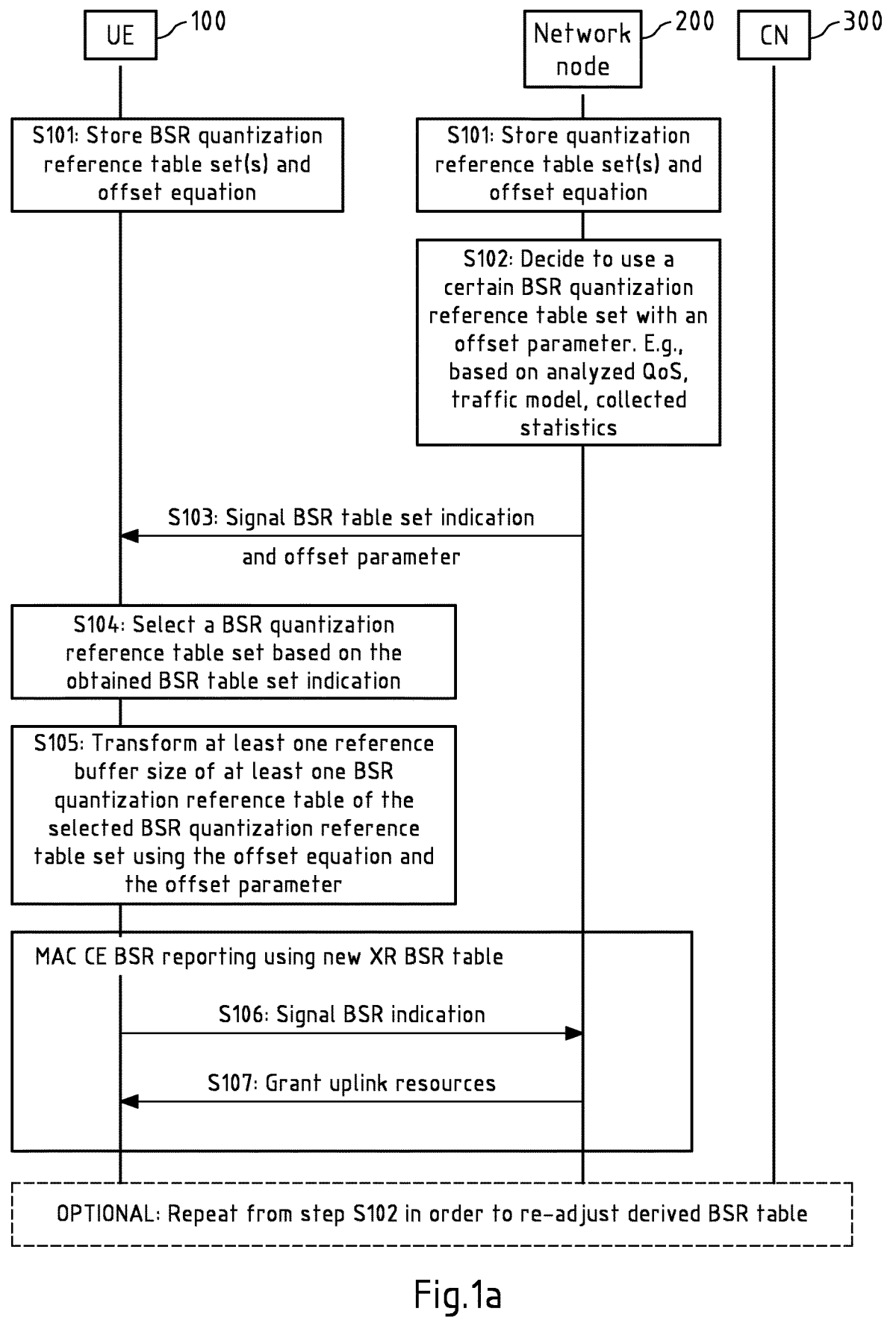

UE ⌐100

Network node ⌐200

CN ⌐300

S101: Store BSR quantization reference table set(s) and offset equation

S101: Store quantization reference table set(s) and offset equation

S102: Decide to use a certain BSR quantization reference table set with an offset parameter. E.g., based on analyzed QoS, traffic model, collected statistics S103: Signal BSR table set indication and offset parameter S104: Select a BSR quantization reference table set based on the obtained BSR table set indication S105: Transform at least one reference buffer size of at least one BSR quantization reference table of the selected BSR quantization reference table set using the offset equation and the offset parameter MAC CE BSR reporting using new XR BSR table S106: Signal BSR indication S107: Grant uplink resources OPTIONAL: Repeat from step S102 in order to re-adjust derived BSR table

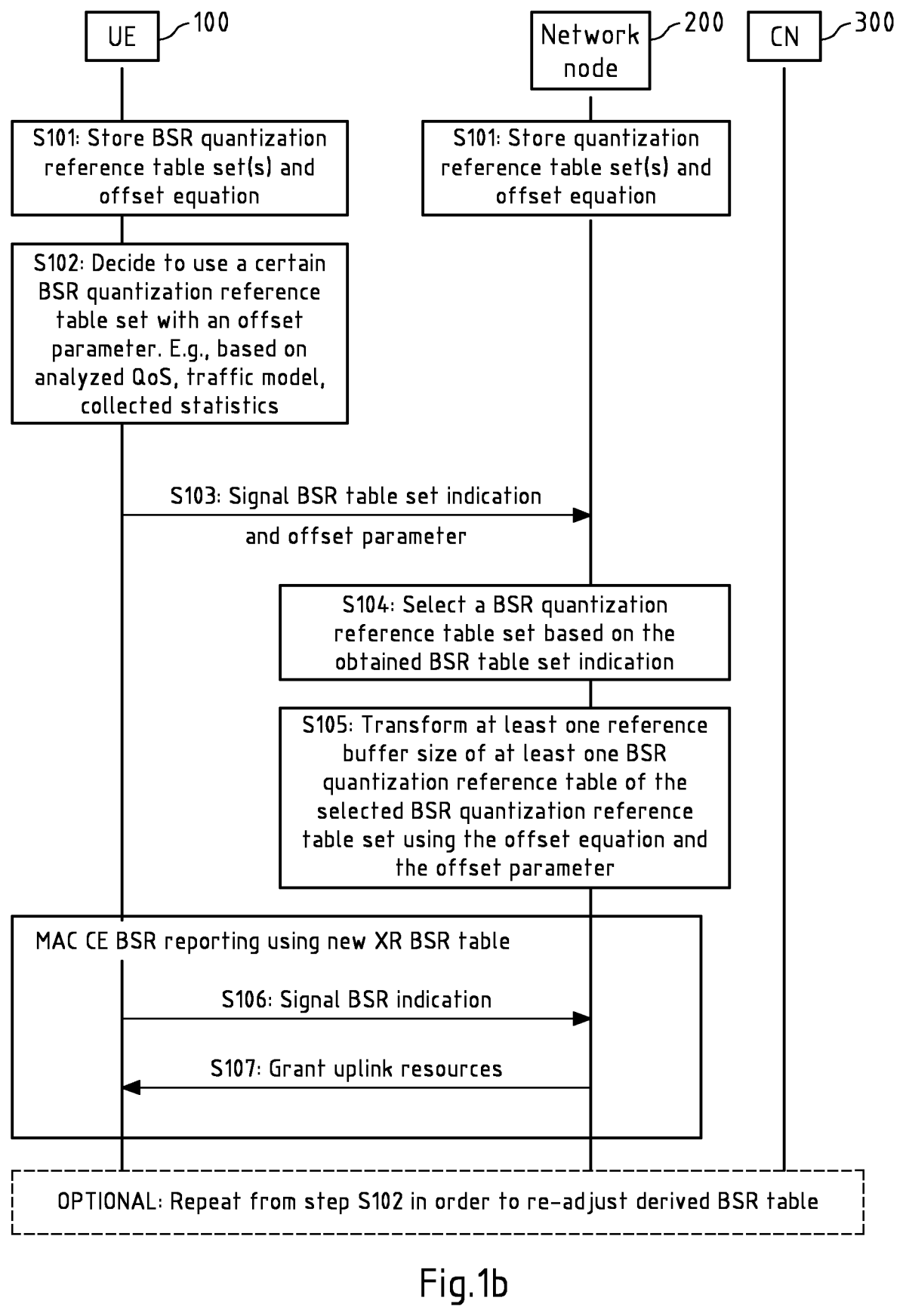

Network node ⌐200

CN ⌐300

S101: Store BSR quantization reference table set(s) and offset equation

S101: Store quantization reference table set(s) and offset equation

S102: Decide to use a certain BSR quantization reference table set with an offset parameter. E.g., based on analyzed QoS, traffic model, collected statistics S103: Signal BSR table set indication and offset parameter S104: Select a BSR quantization reference table set based on the obtained BSR table set indication S105: Transform at least one reference buffer size of at least one BSR quantization reference table of the selected BSR quantization reference table set using the offset equation and the offset parameter MAC CE BSR reporting using new XR BSR table S106: Signal BSR indication S107: Grant uplink resources OPTIONAL: Repeat from step S102 in order to re-adjust derived BSR table

Fig.1b

Store at least one buffer status report (BSR) quantization reference table set and an offset equation ⟋M100 obtaining a BSR table set indication and an offset parameter ⟋M102

Selecting a BSR quantization reference table set ⟋M104 transforming at least one reference buffer size to a derived buffer size ⟋M106 utilizing the derived buffer size to communicate ⟋M108

800
801
802
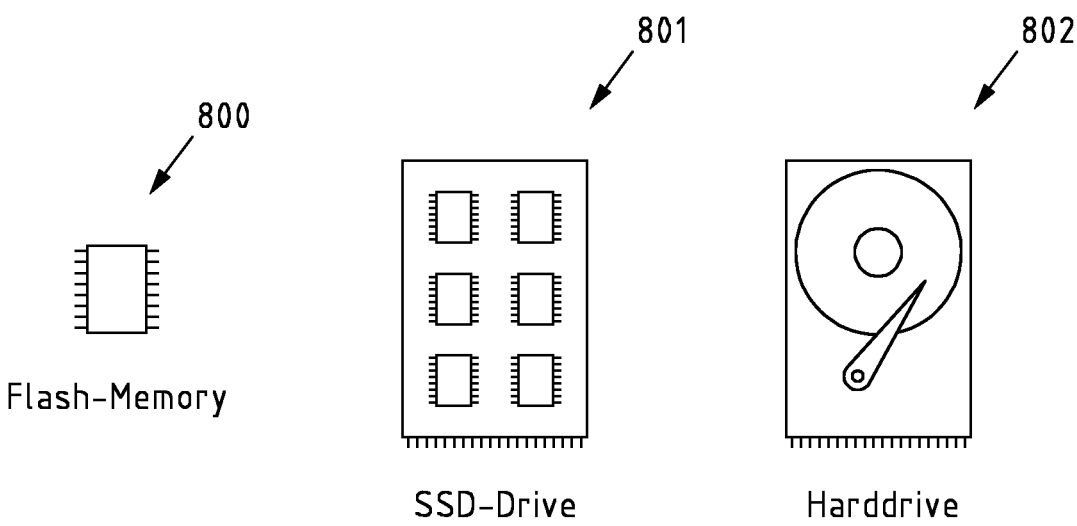
Flash-Memory        SSD-Drive        Harddrive
803
804
805
806
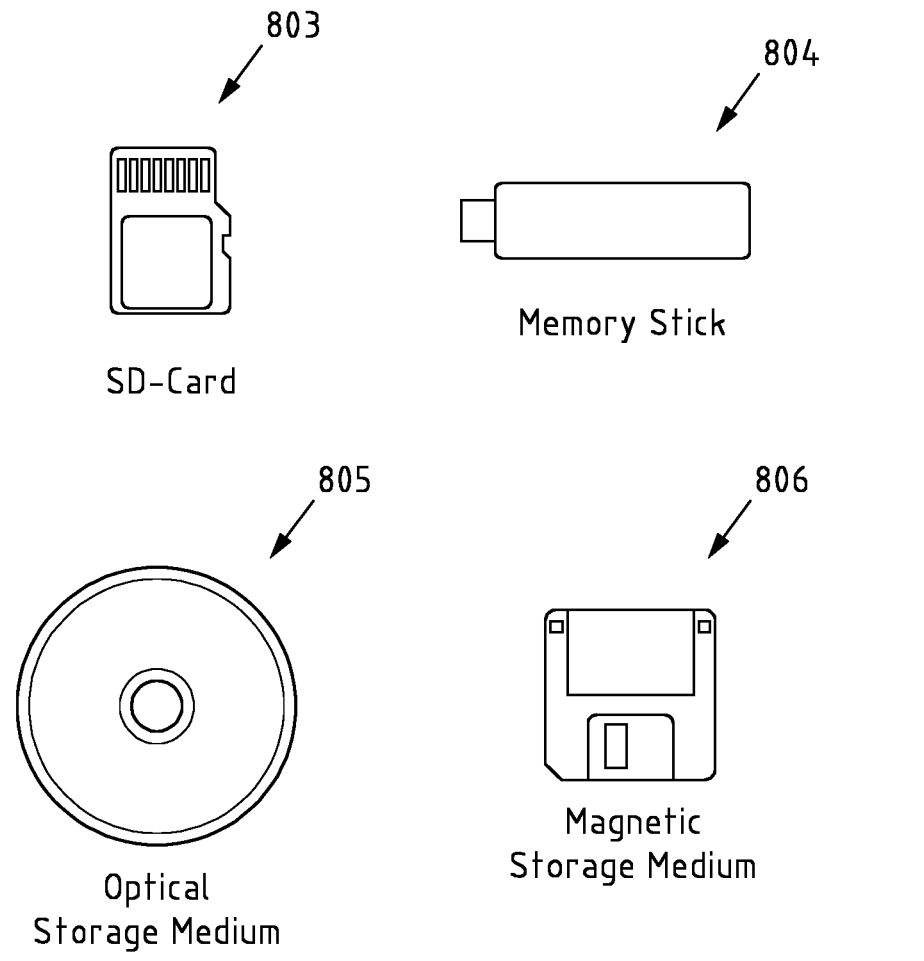
SD-Card        Memory Stick
Optical
Storage Medium        Magnetic
Storage Medium
Fig.8

BUFFER SIZE SIGNALING

FIELD

The following disclosure relates to the field of communication technology, in particular in a communication network, in particular a wireless communication network. The disclosure relates buffer size tables used by at least one of user equipments (UE) or network nodes. The disclosure relates, inter alia, to a flexible, computationally lightweight approach of providing adjustable buffer size tables.

BACKGROUND

In modern communication technologies, buffer sizes may need to be indicated, in particular repeatedly, from a first network entity (e.g., a UE) to a second network entity (e.g., a network node). To avoid transmitting the value of buffer size and enable a more compact representation, tables may be used that map table indices to buffer sizes. Such tables are known as buffer status report (BSR) tables. Such tables may be statically predefined and stored both in the UE and a network node so that the indication of an index to a BSR table is sufficient for indicating a buffer size. A static table may however not suit every use case.

SUMMARY OF SOME EXEMPLARY EMBODIMENTS

A UE may indicate to a network node, for instance via a Media Access Control Control Element (MAC CE), if data will be transmitted uplink (UL) and if so, how much data will be transmitted in uplink from the UE to the network node. The network node will then allocate sufficient resources (e.g., transport block size (TBS), for the indicated amount of data to be transmitted from the UE to the network node. The network may, e.g., upon successful allocation, confirm such allocation to the UE with an uplink grant (UL Grant) transmitted to the UE. If the UE does not indicate a buffer size, the network node may not allocate resources or transmit a UL Grant back to the UE.

The use of BSR tables in general enables to indicate a required buffer size via an index. This reduces signaling overhead compared to indicating the actual buffer size. This comes at a price, as a BSR table needs to be predefined and static and only comprises a limited number of entries. Using such a table therefore necessarily entails a quantization error in the majority of every buffer size selections. The amount of data that accumulates in a UE in order to be transmitted to the network node will almost never equate the exact buffer size indicated by the index to the BSR table. If insufficient resources are allocated (buffer size of the UE too large for resources allocated by the network node), the network node may need to re-schedule the UE for the remainder of the uplink data which causes high latency and lowered uplink throughput. If excessive resources have been allocated (buffer size of the UE smaller than allocated resources), the UE may need to pad the transmitted data with zeros which results in a decreased spectral efficiency.

Another limitation introduced by BSR tables is that they represent a fixed distribution of buffer sizes. Such a fixed BSR table has to cover as large a range or communication use cases as possible. Current BSR table buffer sizes are distributed according to an exponential distribution for instance. Such a distribution best suits enhanced Mobile Broadband (eMMB) traffic and Ultra-High Reliability and Low Latency (URLLC) type of communication use cases. A single distribution will, however, not fit all communication use cases perfectly and may for some of them cause excessive quantization errors.

Next-generation wireless communication systems may comprise communication modes such as extended reality (XR) that exhibit distributions of required buffers sizes that are entirely different from use past cases. If the same BSR tables as defined for other traffic types will continue to be used this is bound to lead to at least one of increased latency or decreased spectral efficiency. In particular compared to eMBB traffic, an XR use case will experience quantization effects more often and with higher probability for a larger quantization error. In addition, the delay constrain would be further stressed by over-allocated padding in the cell.

Dynamic signaling of entire BSR tables and/or traffic parameters in order to generate BSR tables between network entities (e.g., UE and network node) may enable the provision of adapted tables for given use cases but causes intense usage of network resources. Alternatively, defining large numbers of BSR tables and storing them (e.g., in working memory of mobile devices) increases memory consumption and is therefore undesirable. Alternatively again, instead of a table (i.e., a group of static associations between an index and a value), a generating function (e.g., parametrized on traffic parameters) may be used to reduce memory consumption. However, consumption of computational resources on an often resource limited device (e.g., UE) is the downside of this approach.

It is thus, inter alia, an object to enable a provision of BSR tables that is computationally efficient, causes little communication overhead and integrates into existing communication technology.

According to a first exemplary aspect, a method is disclosed, comprising:

storing at least one buffer status report (BSR) quantization reference table set comprising at least one BSR quantization reference table, wherein the BSR quantization reference table comprises at least one association between a BSR indication and a respective reference buffer size and an offset equation, obtaining at least one of a BSR table set indication or an offset parameter, selecting a BSR quantization reference table set from the at least one BSR quantization reference table set based on at least one of the obtained BSR table set indication or the offset parameter, and transforming at least one reference buffer size of at least one of the BSR quantization reference table comprised by the selected BSR quantization reference table set to at least one derived buffer size using the offset equation and the obtained offset parameter, utilizing the at least one derived buffer size in communication between the apparatus and another apparatus.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a node in a communication system and/or by a user equipment (UE). For instance, the method may be performed and/or controlled by using at least one processor of the electronic device.

According to a further exemplary aspect, a computer program is disclosed, the computer program when executed by a processor causing an apparatus, for instance a server, a network node or a UE, to perform and/or control the actions/steps of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read—(e.g., only) Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise (e.g., only) the disclosed components, for instance means, processor, memory, or may further comprise one or more additional components.

A user equipment (UE) may for instance correspond to a mobile device such as for example a mobile phone, tablet, smartwatch, a laptop, a Personal Digital Assistant (PDA) device, a wearable, an Internet-of-Things (IOT) device, an IIOT (Industrial IOT) device the vehicle and/or combinations thereof. Such a user equipment may also be referred to as user device.

A network node may correspond to a component of a communication network such as for instance a Base Transceiver Station (BTS), a nodeB, an evolved node B (eNB), a Next Generation NodeB (gNB), a distributed unit (DU), a central unit (CU) and/or combinations thereof.

The method may be performed by an apparatus. The apparatus may store at least one buffer status report (BSR) quantization reference table set. For instance, the BSR quantization reference table set may be stored in a memory attached to the apparatus. For instance, the memory may be a local memory (e.g., of the apparatus) and/or at least one of physically or logically connected to the apparatus. Storing of information (such as the BSR quantization reference table set) may for instance mean, inter alia, that the information can be accessed directly, e.g. without needing to communicate with another apparatus. Storing may comprise storing at least part of the stored information in the working memory of the apparatus. Storing the BSR quantization reference table set may enable to access it repeatedly. Thereby, the BSR quantization reference table set does not need to be (e.g., repeatedly) received over the communication network.

The apparatus may store exactly one BSR quantization reference table set. It may also store at least two, three or more BSR quantization reference table sets.

A given BSR quantization reference table set comprises at least one BSR quantization reference table. The BSR quantization reference table set may for instance comprise one, two, three, four or more BSR quantization reference table(s).

A BSR quantization reference table, in particular the at least one BSR quantization reference table comprised in the BSR quantization reference table set, comprises at least one association between a BSR indication and a respective reference buffer size. A table may be represented as rows and columns but can be stored in different ways e.g. in a memory, such as for instance an array, a graph, a dictionary, a list or the like. A table may for instance be defined as group of a static associations between an indication (e.g., BSR indication) and a value (e.g., reference buffer size) corresponding to that indication. The association between these two may for instance correspond to them being the same row of table, by an index-value pair of an array (e.g., by a pointer to a memory address), by an edge in a graph between a node representing an indication and a node representing a value, a key-value pair of a dictionary, an item number of a list to a list entry at that item number. For instance, a BSR quantization reference table may comprise two or more associations between a respective BSR indication and a respective reference buffer size. The BSR indication may be ordered in an ascending order. For instance, the reference buffer sizes are monotonically rising across BSR indications.

The BSR indication may for instance be an indication for the BSR quantization reference table to which a certain reference buffer size (e.g., reference buffer size value) may correspond. According to the above examples, a BSR indication may for instance be a row index of a BSR quantization reference table, an index to an array, a node of a graph representing the indication, a key of a dictionary or an item number of a list.

A given reference buffer size may correspond to an actual buffer size that may be used for communication just like the entries of the current BSR table. The reference buffer size may also primarily (e.g., only) serve the purpose of indicating a certain distribution of buffer sizes across BSR indications without being adapted to be used as a buffer size in communication without further processing. The reference buffer sizes of a given BSR quantization reference table may for instance be smaller than the buffer sizes actually required. The reference buffer size may for instance be integer-valued or be represented by an integer value.

The apparatus is further configured to store an offset equation. The offset equation may accept at least a reference buffer size as an input and output a buffer size. The output buffer size may at least in some cases (e.g., if the reference buffer size is different from zero) differ from the input reference buffer size. For instance, the output buffer size may be larger than the input reference buffer size. The output buffer size may for instance be integer-valued or be represented by an integer value. The output buffer size may indicate a number of bytes to be allocated by a network node for an upcoming uplink transmission.

The apparatus may store one offset equation or two or more multiple offset equations.

The offset equation may be at least one of predefined or static, i.e., unchanged. The offset equation may be stored in/by the apparatus and in/by at least one other apparatus. For example, the offset equation may be stored in a UE and in a network node.

The offset equation may accept at least one other input, in addition to the reference buffer size.

The apparatus may further be configured to obtain a BSR table set indication and an offset parameter.

A BSR table set indication may for instance indicate a BSR quantization reference table set. For instance, at least one association between a BSR table set indication and a BSR quantization reference table set may be stored by the apparatus. The association may be of the type of one of the exemplary association types between BSR indication and reference buffer size disclosed above (e.g., table, array, list, graph, dictionary and/or combinations thereof). A BSR table set indication may for instance correspond to an index from which a BSR quantization reference table set may be inferred.

A BSR table set indication may for instance additionally or alternatively correspond to the offset parameter. I.e., the offset parameter may serve the purpose of indicating that the BSR quantization reference table set is to be used by the apparatus. For instance, the apparatus may store a BSR quantization table set that does not require and/or allow any transformation of its buffer sizes on the one hand and a (e.g., single) BSR quantization reference table set which does required and/or allow transforming its values by using the offset equation and the offset parameter. In this case, the offset parameter itself, when obtained by the apparatus, indicates the use of the (e.g., single) BSR quantization reference table set as opposed to the BSR quantization table set.

In case the at least one BSR quantization reference table sets comprise at least two BSR quantization reference table sets the BSR table set indication may comprise an indication of one of the at least two BSR quantization reference table sets. For instance, in this case, the BSR table set indication may comprise an a reference, e.g., an index, to one of the BSR quantization reference table sets.

The offset parameter may for instance be a scalar value, the offset parameter may also be vector-valued or be represented by a vector. The offset parameter may be integer-valued or be represented by an integer value. The offset value may also correspond to a letter, a floating-point number an offset type indicator, a Boolean, and/or combinations thereof. The offset parameter may for instance take values of powers of 2 only.

The offset parameter and the BSR table set indication may be obtained (e.g. received) jointly, for instance in a single signaling or in connected signalings. E.g., such connected signalings may be part of the same signaling sequence, e.g., part of the same (e.g., standardized) signal exchange, and may thus typically occur in a mutually correlated (e.g., correlated in time) manner. The offset parameter and the BSR table set indication may also be obtained (e.g. received) separately and/or independently, for instance in mutually independent signalings. For instance, the BSR table set indication may be obtained independently from the offset parameter and vice versa. For instance, the BSR table set indication may be obtained in a first signaling first (for instance jointly with a first offset parameter) and (e.g. only) subsequently in a separate signaling, an offset parameter (for instance either a first one or a second one that may for instance differ from the first previously obtained one) may be obtained (e.g. received) in another signaling which may in particular be independent of the first signaling. A signaling may for instance correspond to a at least one of a MAC CE, a Radio Resource Control (RRC) signaling (e.g., a BSR-Config RRC message), a Downlink Control Information (DCI), or an Uplink Control Information (UCI). Obtaining via signaling is merely used as an example here and other types of obtaining are disclosed as well which may also occur for the offset parameter and the BSR table set either jointly or independently.

Obtaining may comprise receiving the respective piece of information (e.g., offset parameter and/or BSR table set index) by a signaling as detailed above. Additionally or alternatively, obtaining a piece of information may comprise deriving a piece of information. For instance, the apparatus may be configured to analyze and/or predict at least one aspect of the current and/or expected traffic (e.g., from a UE to a network node) (e.g., required buffer size distributions, data rate, frame rate, current quantization error, current latency and/or combinations thereof) and deduce an offset parameter and/or BSR table set index. The UE and/or network node may make use of their respective traffic tracking and/or shaping capabilities to obtain at least one of the offset parameter and/or BSR table set index. Additionally or alternatively to analyzing traffic.

Additionally or alternatively, the obtaining may comprise considering current and/or expected applications used by a network entity, in particular by the UE and/or the network node, for instance by the apparatus. This may for instance be the case in application-aware Radio Access Networks (RAN).

Additionally or alternatively, the obtaining may comprise maintaining a previously obtained piece of information (e.g., offset parameter and/or BSR table set index) available. For instance, obtaining may comprise storing the respective piece of information. For instance, the BSR table set index may be held available in memory while a new offset parameter is obtained via a signaling or is derived or vice versa.

The apparatus is further configured to select a BSR quantization reference table set from the at least one BSR quantization reference table set based on the obtained BSR table set indication. In this way, a selected BST quantization reference table set is obtained by the apparatus.

The apparatus is further configured to transform at least one reference buffer size. The reference buffer size belongs to at least one of the BSR quantization reference table comprised by the selected BSR quantization reference table set. Through the transforming, at least one derived buffer size is obtained. The derived buffer size is suitable in value to indicate a buffer size for an actual amount of data that may be transferred from UE to the network in uplink direction. The transforming is done by using the offset equation and the obtained offset parameter. For instance, the offset equation comprises a step of offsetting (e.g., adding or subtracting a (e.g., constant) value), scaling (e.g., multiplying by an (e.g., constant, e.g., integer) value or dividing by an (e.g., constant) value), distorting, inverting, taking a power, applying a function and/or combinations thereof.

The reference buffer sizes within a given BSR quantization reference table are quantized, i.e. assume a limited set of distinct values. The derived buffer sizes after transforming the reference buffer sizes using the same offset equation and the same offset parameter are also quantized. Still, by varying the offset parameter and/or the offset equation, a large range of derived buffer size values can be accessed.

The apparatus is further configured to utilize the at least one derived buffer size in communication between the apparatus and another apparatus. For instance, the apparatus may correspond to a UE. In this case, the apparatus may use the at least one derived buffer size to derive a BSR indication which corresponds to a currently required amount of uplink resources. The apparatus may for instance perform a search in the BSR quantization reference table while repeatedly transforming its values using the offset equation and the offset parameter until the best match between derived buffer size and required amount of UL resources is reached. The apparatus may then transmit the BSR indication to a network node. The apparatus may correspond to a network node. In this case, the apparatus may receive, e.g., from a UE, a BSR indication and may transform the received BSR indication to a derived buffer size. The apparatus may then allocate resource corresponding to the derived buffer size and may optionally submit a grant message to the UE.

Here and in the following resources denote radio resources.

The apparatus may be configured to perform all or a subset of the above steps within an existing communication session. For instance, before all of or at least some of the steps are preformed by the apparatus, a communication session, such as for instance an extended reality (XR) Protocol Data Unit (PDU) session, may have been established comprising the required signaling such as QoS negotiation, Time-sensitive Communication Assistance Information (TSCAI). The apparatus may thus be configured to adjust the table of buffer sizes (reference and/or derived) during an existing communication session and may thus adaptively adjust to the requirements (e.g., typical uplink resource demands/requirements) of a given use case such as for instance extended reality.

According to an embodiment of the first exemplary aspect,
   utilizing the at least one derived buffer size comprises to
      derive a BSR indication corresponding to one of the at least one derived buffer size; and
   transmit the derived BSR indication to another network entity.

The method as disclosed in the previous paragraph in particular may be regarded as a separate aspect that may in particular relate to a UE. The method may for instance be performed and/or controlled by an apparatus, for instance the method may for instance be performed and/or controlled by an electronic device, e.g. a user equipment (UE). For instance, the method may be performed and/or controlled by using at least one processor of the electronic device.

According to a further exemplary aspect, a computer program is disclosed, the computer program when executed by a processor causing an apparatus, for instance a server, a network node or a UE, to perform and/or control the actions/steps of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read—(e.g., only) Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first exemplary aspect. Such an apparatus may be considered as or be an apparatus according to a second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise (e.g., only) the disclosed components, for instance means, processor, memory, or may further comprise one or more additional components.

The apparatus of this embodiment may for instance be a UE, e.g. a UE as disclosed above.

A BSR indication may for instance correspond to an index to a BSR quantization reference table comprised in the selected a BSR quantization reference table set. A BSR indication may for instance correspond to an index of a respective BSR quantization reference table. If a BSR indication corresponds to a derived buffer size this may in particular mean that the BSR index points to, in combination with a given a BSR quantization reference table, to a reference buffer size which, when transformed using the offset equation and the offset parameter, translates to the derived buffer size.

Deriving a BSR indication may for instance be understood, as used herein, that for a given required buffer size, a corresponding BSR indication is searched for. The required buffer size may for instance reflect required resources for an impending uplink data transmission, for instance according to an extended reality use case. Such an uplink data transmission may occur periodically, for instance at a given frame rate. The frame rate may indicate how often an uplink data transmission occurs per second.

The corresponding BSR indication may translate to a derived buffer size which best matches the required buffer size. For instance, the derived buffer size may correspond to the smallest derived buffer size possible (e.g., for a given BSR quantization reference table and an offset parameter) which is still larger than the required buffer size.

The derivation may for instance be realized in a simple linear search approach, wherein the apparatus may first transform the smallest reference buffer size according to the lowest BSR indication to a derived buffer size and compare it to the required buffer size. As long as the derived buffer size is smaller than the required buffer size, it may increment the BSR indication by one step (i.e., step to the next bigger BSR indication) and transform the corresponding reference buffer size to a derived buffer size. Once the derived buffer size is larger than (e.g., or equal to) the required buffer size, the corresponding BSR indication may be assumed as the derived BSR indication. Different search algorithms may be used such as a binary search, a ternary search, a jump search, an interpolation search, a Fibonacci Search and/or combinations thereof.

During or in conjunction with the derivation of the BSR indication, the apparatus may either transform individual reference buffer sizes using the offset equation as disclosed in the embodiment above. Additionally or alternatively, the apparatus (e.g. of the second and/or third aspect as disclosed below) may first transform a subset of or all reference buffer sizes of a respective BSR quantization reference table in order to obtain a derived BSR quantization table comprising associations between BSR indices (e.g., the same as for the BSR quantization reference table) and respective derived buffer sizes. During search, the apparatus may then simply look up the derived buffer sizes for a given BSR indication using the derived BSR quantization table during the derivation of the derived BSR indication.

The apparatus may then transmit the derived BSR indication to another network entity. Such a network entity may in particular correspond to a network node. By transmitting the derived BSR indication, the apparatus may indicate the required resources for a next uplink data transmission. The derived BSR indication may be transmitted as at least one of a MAC Control Element (MAC CE), a Radio Resource Control (RRC) signaling, a Downlink Control Information (DCI) or an Uplink Control Information (UCI).

According to an embodiment of the first exemplary aspect, the method further comprises receiving a BSR indication from another network entity, wherein transforming at least one reference buffer size comprises transforming a reference buffer size corresponding to the received BSR indication to a derived buffer size, and utilizing the at least one derived buffer size comprises to utilizing the derived buffer size for scheduling.

The method as disclosed in the previous paragraph may be regarded as a separate aspect any may for instance be performed by a network node. For instance the method may be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a network node in a communication system and/or by a user equipment (UE). For instance, the method may be performed and/or controlled by using at least one processor of the electronic device.

According to a further exemplary aspect, a computer program is disclosed, the computer program when executed by a processor causing an apparatus, for instance a server, a network node or a UE, to perform and/or control the actions/steps of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read—(e.g., only) Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first exemplary aspect. Such an apparatus may be considered as or be an apparatus according to a third exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise (e.g., only) the disclosed components, for instance means, processor, memory, or may further comprise one or more additional components.

The apparatus of this embodiment may for instance be a network node. The apparatus may for instance receive the derived BSR indication from a UE. The another apparatus from which the apparatus receives the BSR indication may have derived the BSR indication. The received BSR indication may be a derived BSR indication.

The apparatus may receive the derived BSR indication as at least one of a MAC Control Element (MAC CE), a Radio Resource Control (RRC) signaling, a Downlink Control Information (DCI) or an Uplink Control Information (UCI). By receiving the BSR indication, the apparatus may be informed of the size of a required uplink resource. For instance, the uplink resource may comprise a transport block size (TBS). The TBS may be configured to accommodate a buffer size as indicated by the BSR indication. The apparatus may for instance be configured to receive the derived BSR indication before translating a reference buffer size to a derived buffer size of additionally or alternatively afterwards.

The apparatus may translate a reference buffer size to a derived buffer size. The reference buffer size may correspond to the received BSR indication. For instance, the apparatus may be configured to receive the BSR indication first and afterwards select a reference buffer size based on the received BSR indication and subsequently transform the reference buffer size to a derived buffer size. For instance, the apparatus may use the received BSR indication as a reference to a given BSR quantization reference table of the selected BSR quantization reference table set and transform it to a derived buffer size using the offset equation and an offset parameter.

Additionally or alternatively, the apparatus may be configured to first (e.g., before receiving the received BSR indication) transform a subset or all of the reference buffer sizes of a given BSR quantization reference table of the selected BSR quantization reference table set to a derived BSR quantization table comprising derived buffer sizes. This transformation step may also in this case comprise transforming the reference buffer size corresponding to the received BSR indication. This is because the transformation of a subset or all of the reference buffer sizes of a given BSR quantization reference table which are transformed to respective derived buffer sizes may comprise the respective reference buffer size corresponding to the BSR indication. The derived BSR quantization reference table may be stored by the apparatus. The derived BSR quantization reference table may be used as a look-up table to obtain derived buffer sizes for respective received BSR indications.

The apparatus is further configured to utilize the at least one derived buffer size corresponding to the received BSR indication for scheduling. Such scheduling may comprise allocating resources such as for example uplink resources. An uplink resource may comprise a transport block size (TBS). The TBS may be configured to accommodate the derived buffer size as indicated by and/or corresponding to the received BSR indication.

The apparatus may be configured to further acknowledge the allocation of resources to another apparatus, for example to the apparatus from which it received the BSR indication. The apparatus may for instance transmit an Uplink Grant (UL Grant) message to the another apparatus.

According to an embodiment of the first, second and/or third exemplary aspect, the at least one BSR quantization reference table set
        comprises at least one of
        at least two BSR quantization reference table sets;
        at least two BSR quantization reference table sets,
            wherein the BSR quantization reference table sets
            mutually differ in their buffer size distributions; or
        a BSR quantization table set and a BSR quantization
            reference table set.

The at least one BSR quantization reference table set may comprise at least two BSR quantization reference sets. For instance, the BSR quantization reference table sets mutually differ in at least one property. For instance, the BSR quantization reference table sets may differ in buffer size distributions. A distribution of a BSR quantization reference set may be defined as the distribution of reference buffer sizes in at least one or all of the BSR quantization reference tables comprised by the BSR quantization reference table set. In particular, the BSR quantization reference tables comprised by a BSR quantization reference table set may be distributed according to a common distribution.

By storing at least two BSR quantization reference table sets of different reference buffer size distributions, the apparatus (e.g. of the second and/or third exemplary aspect) is capable of matching the requirements of different use cases. For instance, one of the BSR quantization reference table set may be distributed according to a distribution suitable for eMMB and/or URLLC use cases such as an exponential distribution, for instance. Another BSR quantization reference table set may be distributed according to a distribution suitable for XR use cases such as a truncated Gaussian, for instance at a given standard deviation.

According to an embodiment, the BSR quantization reference table sets comprise a first BSR quantization table set which is not a BSR quantization reference table set and therefore does not require and/or allow any transforming using an offset equation and an offset parameter. For instance, the BSR table set indication for this BSR quantization table set may be set to 0 and/or may be selected by default, e.g., in absence of a BSR table set indication. This BSR quantization table set may be used to ensure backwards compatibility and serve as a legacy support. The BSR quantization table set may for instance comprise a first BSR quantization table comprising $2^5$ entries/associations (i.e., a 5-bit table) and a second BSR quantization table comprising $2^8$ entries/associations (i.e., a 8-bit table) The at least one BSR quantization reference table set in this embodiment further comprises a BSR quantization reference table set that comprises associations between BSR indications and reference buffer sizes and that may be used as described above.

According to an embodiment of the first, second and/or third exemplary aspect, reference buffer sizes comprised by at least one BSR
        quantization reference table comprised by at least one
        BSR quantization reference table set are distributed
        according to at least one of an exponential, a truncated
        Gaussian, a Laplacian, a Chi-Squared, a t-Student, a
        uniform, a triangular, an empirical distribution.

When reference buffer sizes are distributed according to a given distribution, this may denote that the values of reference buffer sizes and/or the differences between adjacent values (i.e., step sizes) are distributed according to the distribution. Values being distributed according to a distribution may mean that the values may be fit by an idealized distribution with an average or maximum error between idealized distribution and respective value across values of less than 1%, 5% or 10%. The distribution may be a mathematically defined distribution, such as for instance at least one of an exponential, a truncated Gaussian (e.g., at a predefined standard deviation and mean value), a Laplacian, a Chi-Squared, a t-Student, a uniform, a triangular distribution and/or combinations thereof. The distribution may also correspond to an empirical distribution that may for instance be derived based on measured data. For instance, required and/or requested buffer sizes may be recorded over time (e.g., by the apparatus or by another apparatus) and the distribution may reflect the probability of a given buffer size occurring.

According to an embodiment of the first, second and/or third exemplary aspect, buffer values comprised by at least one BSR quantization
        reference table comprised by at least one BSR quanti-
        zation reference table set are distributed according to a
        distribution dependent on at least one reference traffic
        characteristic.

A traffic characteristic may for instance comprise buffer sizes (e.g., requested, granted and/or required), a use case (e.g., XR, eMMB or URLLC). An apparatus (e.g., the apparatus performing the steps) may be configured to gather data on statistical properties of the traffic as traffic characteristics (e.g., between a UE and a network node) and may use these to shape a distribution.

According to an embodiment of the first, second and/or third exemplary aspect, at least one of the at least one BSR quantization reference
        table set comprise at least one of
        at least two BSR quantization reference tables; or
        at least two BSR quantization reference table sets,
            wherein the buffer sizes of the at least two BSR
            quantization reference tables are distributed accord-
            ing to a common distribution.

At least one of the at least one BSR quantization reference table sets may comprise at least two BSR quantization reference tables, for example exactly two, three, four, five, or ten. In an example, the (e.g., all) BSR quantization reference table sets comprise the same number of BSR quantization reference tables. Buffer sizes within the BSR quantization reference table of a given BSR quantization reference table set may be distributed according to a common distribution.

According to an embodiment of the first, second and/or third exemplary aspect, at least one BSR quantization reference table set com-
        prises at least two BSR quantization reference tables
        with mutually different number of associations between
        a respective BSR indication and a respective reference
        buffer size.

For instance, the number of associations may be a power of 2 (e.g. $2^x$) respectively, i.e., 1, 2, 4, 8, 16, 32, 64, 128, 256, 512, 1024, 2048, 4096, or higher powers of 2. In an example, one of the BSR quantization reference tables may comprise 2^5 associations and another one in the same BSR quantization reference table set may comprise 2^8 associations.

According to an embodiment of the first, second and/or third exemplary aspect, at least one of the BSR table set indication, the offset parameter or the derived BSR indication is at least one of received or transmitted by at least one of Radio Resource Control (RRC), Medium Access Control (MAC), a MAC Control Element (MAC CE), a DCI or a UCI.

For example, the following signaling means may be used. A UE transmits BSR table set indication by RRC to a network node. A UE transmits BSR table set indication by MAC CE to a network node. A UE transmits BSR table set indication by DCI to a network node. A UE transmits BSR table set indication by UCI to a network node. A UE transmits BSR indication by RRC to a network node. A UE transmits BSR indication by MAC CE to a network node. A UE transmits BSR indication by DCI to a network node. A UE transmits BSR indication by UCI to a network node. A UE transmits offset parameter by RRC to a network node. A UE transmits offset parameter by MAC CE to a network node. A UE transmits offset parameter by DCI to a network node. A UE transmits offset parameter by UCI to a network node. A network node transmits BSR table set indication by RRC to a UE. A network node transmits BSR table set indication by MAC CE to a UE. A network node transmits BSR table set indication by DCI to a UE. A network node transmits BSR table set indication by UCI to a UE. A network node transmits BSR indication by RRC to a UE. A network node transmits BSR indication by MAC CE to a UE. A network node transmits BSR indication by DCI to a UE. A network node transmits BSR indication by UCI to a UE. A network node transmits offset parameter by RRC to a UE. A network node transmits offset parameter by MAC CE to a UE. A network node transmits offset parameter by DCI to a UE. A network node transmits offset parameter by UCI to a UE. The respective signalings may be done independently from one another or jointly. Either UE and/or network node may be an apparatus according to the first, second and/or third exemplary aspect. At least two or three of the BSR table set indication, the offset parameter and the derived BSR indication may be transmitted by the same means or by mutually different means.

According to an embodiment of the first, second and/or third exemplary aspect,
the offset equation comprises at least one of
a multiplication of the reference buffer size by the offset parameter,
an addition of the offset parameter to the reference buffer size or
an application of an upper bound.

The offset equation is used to transform the reference buffer sizes to derived buffer sizes. The offset equation accepts at least the reference buffer size as an input and the offset parameter. In an example, the offset parameter is scalar. Alternatively, the offset parameter may be vector valued and for instance comprise two, three, four or more values. The offset equation may still accept the offset parameter as an input and may use at least one, a subset of at least two or all of the values provided in the offset parameter to transform the reference buffer size. The at least one offset parameter value may be integer-valued and/or floating-point valued. An integer valued offset parameter has the advantage of a computationally cheap usage in the transformation. For instance, the at least one offset parameter value is larger than or equal to 1. In general, the offset parameter value may take any value larger than 0.

A first example of an offset equation may be a multiplication of the reference buffer size by the offset parameter. This may be to be understood that in case of a vector-valued offset parameter, the reference buffer size is multiplied by at least one of the values of the offset parameter. The offset parameter may for instance be used as a factor applied by the offset equation to the reference buffer size. In an example, the apparatus may be configured to only multiply the reference buffer sizes if the offset parameter is not equal to 1 and otherwise skip the multiplication step. For instance, the offset parameter for multiplication may be limited to powers of 2. Thereby, the apparatus may be configured to very quickly compute the multiplication of the reference buffer sizes by a bit-wise shift by one bit per multiplication by 2.

Additionally or alternatively, the offset equation may comprise an addition of the offset parameter to the reference buffer size. This is to be understood that in case of a vector-valued offset parameter, the reference buffer size is transformed by adding at least one of the values of the offset parameter to it. For instance, the addition may only be applied to non-zero reference buffer sizes. By this, the option of indicating a buffer size of zero is maintained.

Additionally or alternatively, the offset equation may comprise an upper bound. For instance, the offset equation may comprise a multiplication by and/or an addition of the offset parameter and a subsequent upper bound (i.e., a step that applies a minimum function between a fixed upper bound value and the value resulting from the previous calculation, i.e., the multiplication and/or the addition). The upper bound ensures that technically sensible possible derived buffer values are obtained from transforming the buffer sizes. The upper bound may for instance correspond to a maximum possible buffer size and/or to a maximum possible allocatable resource size (e.g., maximum transport block size).

According to an embodiment of the first, second and/or third exemplary aspect,
transforming a subset of more than one or the entirety of reference buffer sizes comprised by a given BSR quantization reference table of a BSR quantization reference table set to obtain a derived BSR table and
storing the derived BSR table.

According to an example, all reference buffer sizes within at least one BSR quantization reference table of the selected BSR quantization reference table set are transformed. It is also possible that the reference buffer sizes of a subset or all of the BSR quantization reference tables within the selected BSR quantization reference table set are transformed. By transforming the reference buffer sizes within at least one BSR quantization reference tables of the selected BSR quantization reference table set, a derived BSR table is obtained.

The derived BSR table may be stored, e.g., within the device (e.g. apparatus of the second and/or third aspect). The derived BSR table may later be accessed when it is needed, e.g. for deriving a derived BSR indication (e.g., by a UE, e.g. by searching in the derived BSR table) and/or for deriving a derived buffer size (e.g., by a network node, e.g. by accessing the derived BSR table at the entry indicated by the BSR indication). By storing the derived BSR table, the computational complexity of the steps performed by the apparatus may be minimized as the transformation step (from reference buffer size to derived buffer size) may only be performed once when generating the derived BSR table and after that, accessing the derived BSR table as a look-up table is sufficient. On the other hand, memory consumption is increased as the derived BSR table takes up space in the working memory of the apparatus.

As an example, the apparatus caches transformed derived buffer sizes after needing to compute them using the offset equation and the offset parameter. This may yield a partial derived BSR table. For instance, a limited number of derived buffer sizes may be cached by the apparatus, for instance 10%, 20%, 30%, 50%, 70%, or 90% of the total number of values within a given BSR quantization reference table may be cached after they have been computed for the first time. In particular, the derived buffer sizes may only be computed when needed and after that, they may be cached for a subsequent access. This avoids an initial computation of an entire derived BSR table and at the same time avoids multiple translations yielding the same derived buffer sizes. The cache may be cleared when a new BSR quantization reference table set is selected and/or when the offset parameter changes.

According to an embodiment of the first, second and/or third exemplary aspect, obtaining of at least one of a BSR table set indication or an offset parameter fulfills at least one of:

is based on at least one of an empirically derived traffic characteristic, a traffic parameter, an application type or a device type, is useable to decide whether a currently used BSR table is unsuitable, is based on an obtained trigger signal, is based on an obtained trigger signal, wherein the trigger signal is at least one of received from or emitted by at least one of a user equipment (UE), a network node or a central network entity, is based on an obtained trigger signal, wherein the trigger signal is at least one of received or transmitted by at least one of RRC, MAC CE, DCI or UCI, or is performed periodically in one or more predefined intervals.

Obtaining at least one of a BSR table set indication or an offset parameter may comprise receiving the respective piece of information from another network entity (e.g., a UE or a network node). Additionally or alternatively, the apparatus (be it a UE or a network node) may derive (e.g., select, compute, measure, infer the respective piece of information and/or combinations thereof) the respective piece of information. The apparatus that derives at least one of a BSR table set indication or an offset parameter may then transmit this piece of information to another network entity (i.e., a UE to a network node and/or a network node to a UE).

The apparatus may obtain at least one of a BSR table set indication or an offset parameter based on an empirically derived traffic characteristic. For instance, the apparatus may measure the traffic characteristic and/or another apparatus may perform the measurements. Based on the measurements, at least one of a BSR table set indication or an offset parameter may be obtained (e.g., derived). The traffic characteristic may for instance relate to the type of use case, for instance to an extended reality (XR) use case. The traffic characteristic may for instance relate a requested distribution of buffer sizes, granted resource sizes and/or combinations thereof. The obtaining may additionally or alternatively be based on an application type (e.g., an XR application) or a device type. Additionally or alternatively, the obtaining may be based on a traffic parameter, for instance a frame rate and/or a (e.g., mean) data rate.

According to an embodiment obtaining at least one of a BSR table set indication or an offset parameter may be based on and/or is useable to decide whether the currently used BSR table (e.g., the derived BSR table) is unsuitable (or suitable). For instance, the apparatus may decide that for a given traffic characteristic, a traffic parameter, an application type, a device type and/or combinations thereof, the current BSR table may be unsuitable. For instance, excessive quantization errors and/or decreased spectral efficiency make the BSR table unsuitable.

Additionally or alternatively, the obtaining of at least one of a BSR table set indication or an offset parameter may be based on a trigger signal obtained by the apparatus. The trigger signal may for instance be received from or emitted by a network entity such as a UE, a network node or a central network entity. If the apparatus is a UE, the trigger signal may be received from a network node or a central network entity. In case the apparatus is a network node, the trigger signal may be received by a UE or by a central network entity.

The trigger signal may be sent by the same selection of means as detailed with respect to the BSR table indication, the offset parameter and the BSR indication.

Additionally or alternatively, the obtaining of at least one of a BSR table may be done periodically, for instance in one or more predefined intervals. The obtaining may for instance be done based on a measured time, e.g., by a clock, an oscillator and/or combinations thereof, by an apparatus, e.g., by the apparatus performing at least part of or the method.

According to an embodiment of the first, second and/or third exemplary aspect, the obtaining of an offset parameter comprises to derive the offset parameter based on at least one of at least one traffic parameter, at least one traffic parameter, wherein the traffic parameter comprises a mean frame rate or a mean data rate, at least two traffic parameters, or at least two traffic parameters, wherein the traffic parameters comprise a mean frame rate and a mean data rate.

Obtaining an offset parameter may comprise to derive the offset parameter. Such deriving may for instance be based on a traffic parameter. In an example, the at least one traffic parameter comprises a mean frame rate. A frame rate may for instance be a rate at which a UE (e.g., the apparatus) transmits data in uplink to a network node (e.g., the apparatus). In an example, the at least one traffic parameter comprises a mean data rate. A data rate may be the amount of data a UE (e.g., the apparatus) transmits in uplink per time unit (e.g., per second) to a network node (e.g., the apparatus).

Additionally or alternatively, deriving the offset parameter may be based on at least two traffic parameters. The traffic parameters may comprise the mean frame rate and the mean data rate.

According to a fourth aspect, a system is disclosed comprising at least one apparatus (a UE) of the second exemplary aspect and at least one apparatus (a network node) of the third exemplary aspect.

The system may be configured to jointly, e.g. at least in part, perform the method according to the first exemplary aspect.

All features disclosed for the any of the exemplary aspects are disclosed for the respective other exemplary aspects.

BRIEF DESCRIPTION OF THE DRAWINGS

In the figures show:

FIG. 1a,b respective signaling diagrams showing exemplary embodiments according to the first, second and third exemplary aspect;

FIG. 8 examples of storage media.

FIG. 1*a,b* shows an exemplary embodiment of an interaction between a UE 100 (e.g., according to the second exemplary aspect), a network node 200 (e.g., according to the third exemplary aspect). As an optional further network entity, a central network entity (CN) 300 is shown.

For instance, a communication session may have been established between the UE 100 and the network node 200 prior to performing the steps as shown and disclosed in the following. Alternatively, the signaling shown is at least partially carried out before establishing a communication session.

In step S101, the UE 100 and the network node 200 store at least one BSR quantization reference table set and an at least one offset equation. Storing may for instance mean storing in a (e.g., local) memory of the respective apparatus.

In step S102, the apparatus (in FIG. 1*a* the network node 200 in FIG. 1*b* the UE 100) may decide to use a certain BSR quantization reference table set. The apparatus may further decide to use a certain offset parameter. For the purpose of this decision, the apparatus may analyze quality of service (QOS), traffic characteristics, a traffic model, application type, use case, collect statistics and/or obtain collected statistics. The apparatus may for instance decide that the currently used BSR quantization (e.g., reference) table set is not suitable for the current traffic because for instance, it causes low spectral efficiency and/or high quantization errors.

In step S103, the apparatus that decided to use a certain BSR quantization reference table set and an offset parameter, signals a BSR table set indication and a corresponding offset parameter to the respective other apparatus. The respective other apparatus (in FIG. 1*a*, the UE 100, in FIG. 1*b* the network node 200), obtains the BSR table set indication and the offset parameter. The offset parameter may itself correspond to the BSR table set indication.

Step S104, the apparatus that obtained the BSR table set indication and/or the offset parameter selects a BSR quantization reference table set based on the obtained BSR table set indication.

The apparatus that obtained the BSR table set indication and/or the offset parameter and/or the respective other apparatus may then, in step S105, transform at least one reference buffer size of at least one BSR quantization reference table of the selected BSR quantization reference table set using the offset equation and the offset parameter.

Subsequently, in step S106, the UE 100 may signal a BSR indication to the network node 200 in order to indicate required uplink radio resources.

The network node 200 may subsequently allocate the radio resources requested by the UE 100 using the BSR indication and transmit a UL Grant message to the UE 100 in step S107.

According to an exemplary embodiment, at least one of the apparatus may decide on another BSR quantization reference table set and/or offset parameter and repeat the steps shown starting from S102.

Figures 2, 3A, 3B:
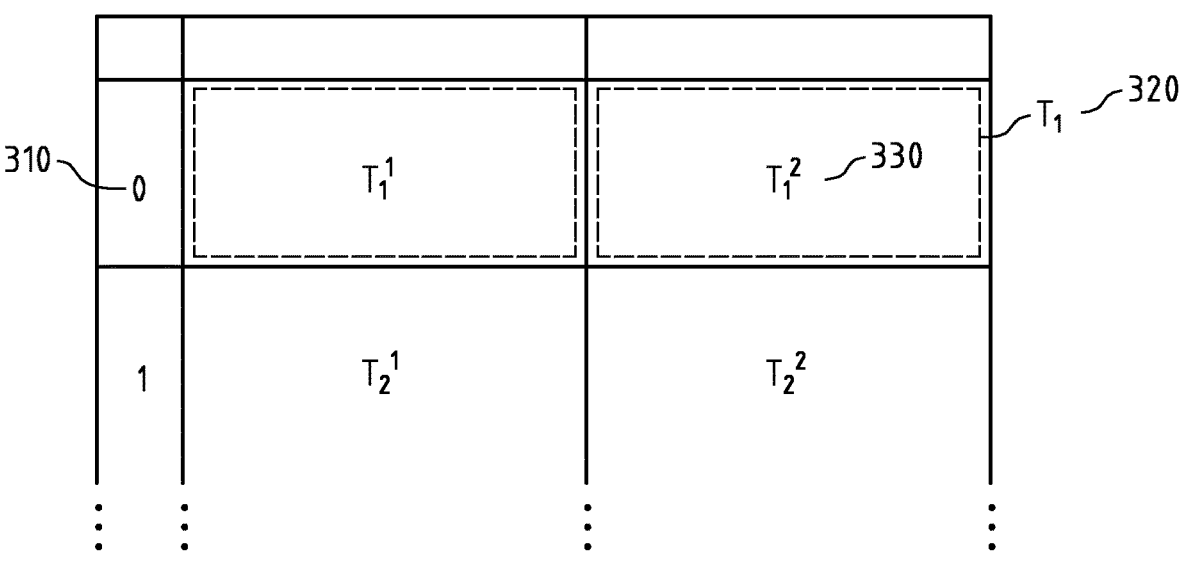
FIG. 2 an exemplary embodiment of a BSR quantization table sets according to the first, second and third exemplary aspect.
FIG. 3*a,b* exemplary embodiments of a BSR quantization table according to the first, second and third exemplary aspect.

FIG. 2 shows an exemplary embodiment of at least one BSR quantization reference table set. A first BSR quantization reference table set $T_1$ 320 comprises a first BSR quantization reference table $T_1^1$ 330 and a second BSR quantization reference table 330 $T_1^2$. Such BSR quantization reference table set(s) may be stored by an apparatus according to the second exemplary aspect and/or by an apparatus according to the first exemplary aspect. The respective apparatus may store at least two BSR quantization reference table sets, a first one $T_1$ and a second one $T_2$. The second BSR quantization reference table set $T_2$ comprises a first BSR quantization reference table $T_2^1$ and a second BSR quantization reference table $T_2^2$. A given BSR quantization reference table set may be selected by an index 310. Such an index may for instance be comprised by the BSR table set indication.

In a given BSR quantization reference table that may be stored by an apparatus according to the second exemplary aspect and/or by an apparatus according to the first exemplary aspect, at least one association 332 between a BSR indication i and a reference buffer size $b^i$ is stored. The association may for instance, see FIG. 3*a* take the form of a row (or column) in a table. Additionally or alternatively, the association 332 may correspond to an edge in a graph as shown in FIG. 3*b*. In another variant, the association may be implemented by a generating function (not shown).

Figure 4A:
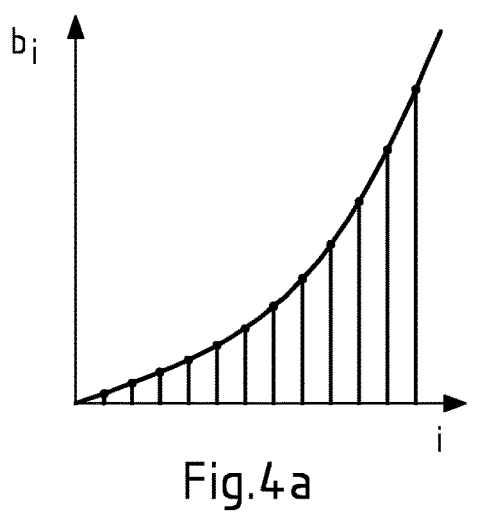
FIG. 4*a-f* exemplary embodiments of reference and derived buffer size distributions according to the first, second and third exemplary aspect.
Figure 4B:
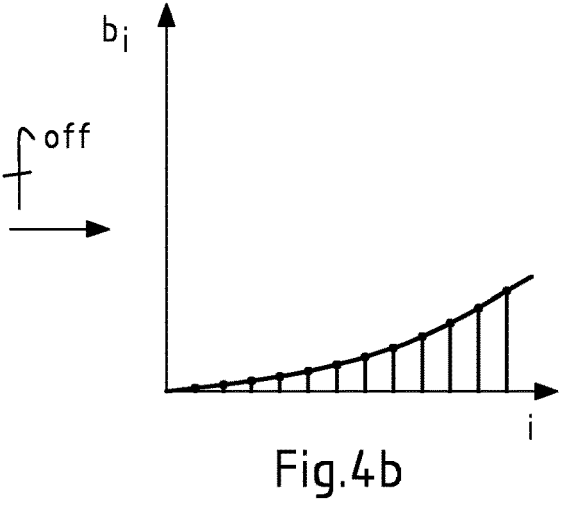
Figure 4C:
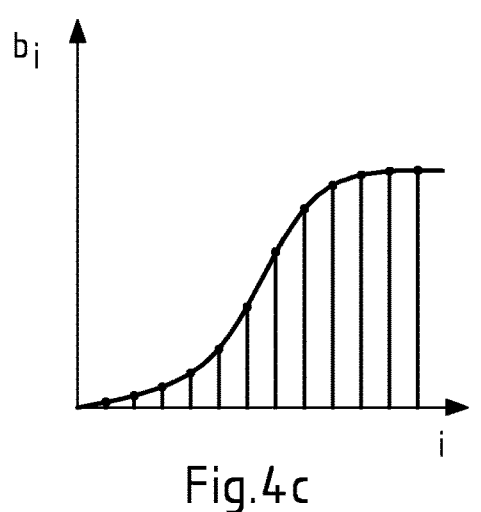
Figure 4D:
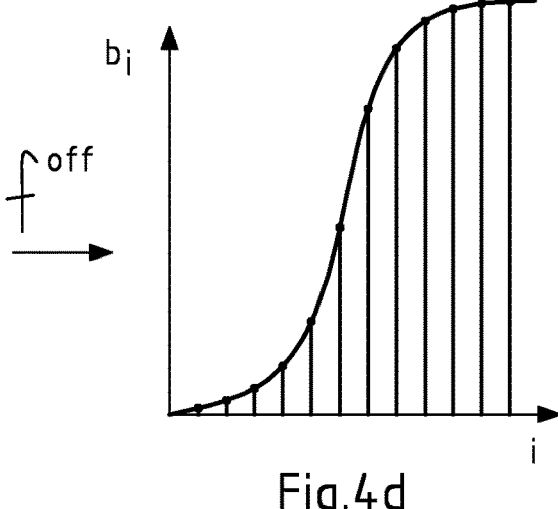
Figure 4E:
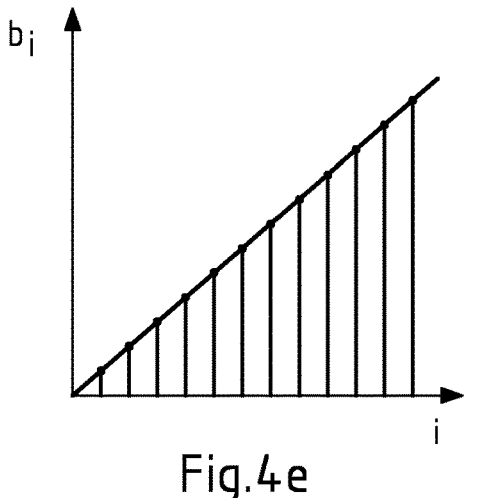
Figure 4F:
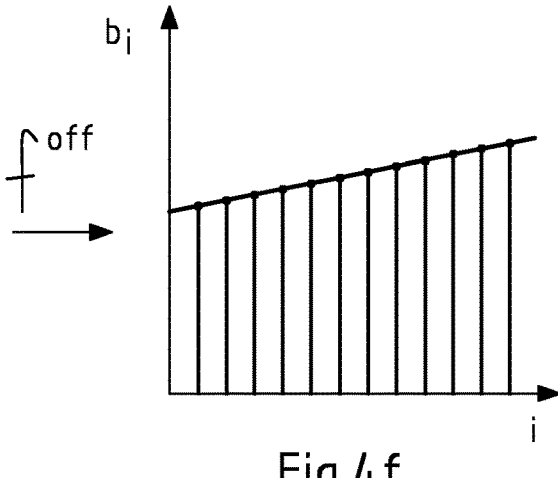

FIG. 4 shows exemplary embodiments of different distributions of reference buffer sizes $b_i$ (FIG. 4*a, c, e*) of a BSR quantization reference table that may be stored by an apparatus according to the second exemplary aspect and/or by an apparatus according to the first exemplary aspect and derived buffer sizes $b_i^d$ (FIG. 4*b, d, f*). FIG. 4*a, b* shows an exponential distribution, FIG. c, d a truncated Gaussian step size distribution (i.e., cumulated Gaussian buffer size distribution) and FIG. e, f a uniform step size distribution and a triangular buffer size distribution. The derived buffer sizes in FIG. 4*b, d, f* demonstrate the effect of the respective offset function with $f^{off}$ an offset parameter. In FIG. 4*a,b*, the offset function implements a multiplication by an offset parameter smaller than one. FIG. 4*c,d* shows the effect of a multiplication by an offset parameter larger than one. FIG. 4*e,f* show a variant in which the offset function implements a multiplication by an offset parameter value smaller than one and an addition of an offset parameter value.

Figure 5:
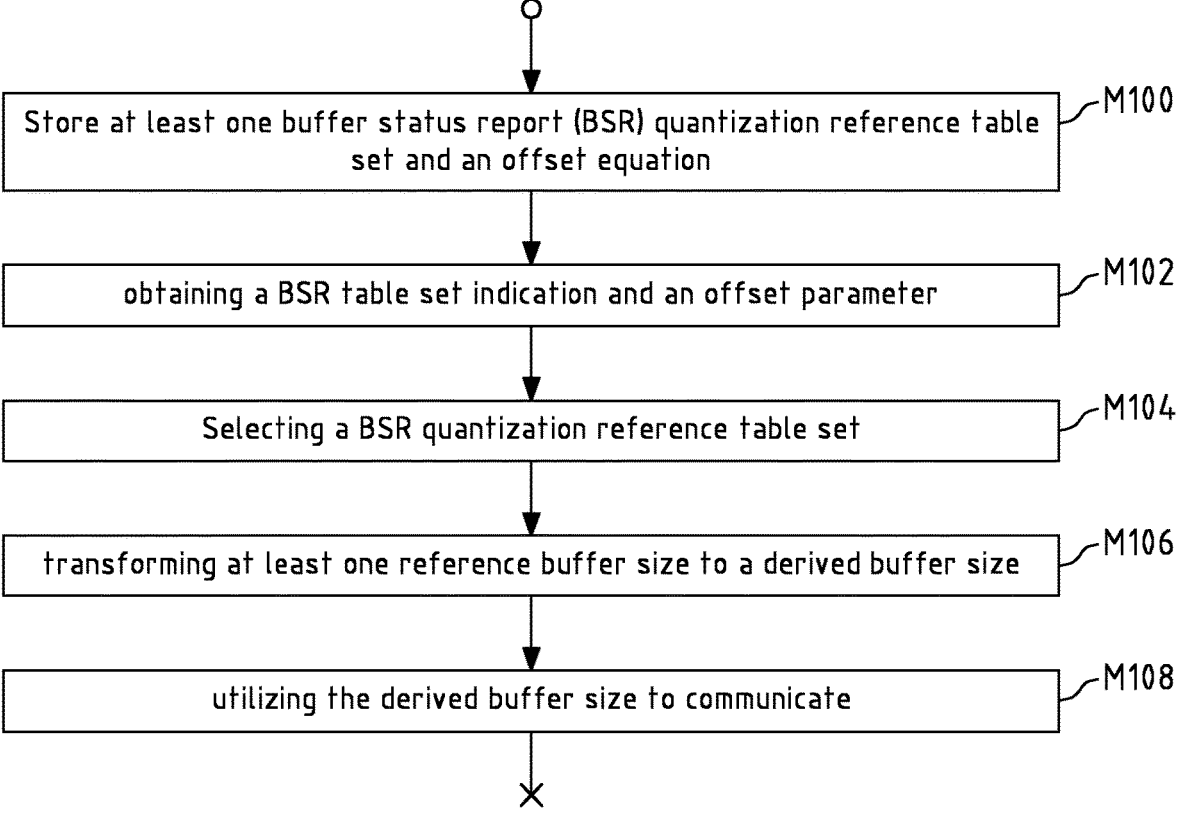
FIG. 5 a flow chart of a method according to an embodiment according to the first, second and third exemplary aspect.

FIG. 5 shows a flow chart of the steps according to the method according to the first exemplary aspect that may be performed by an apparatus according to the second exemplary aspect and/or by an apparatus according to the first exemplary aspect.

In step M100, the apparatus stores the BSR quantization reference table set and an offset parameter.

In step M102 the apparatus may obtain a BSR table set indication and an offset parameter. For instance, the apparatus may derive the respective quantity, e.g., by analyzing the traffic. Additionally or alternatively, the apparatus may receive the respective quantity, e.g., from another network entity, e.g., from a UE in case the apparatus is a network node or from a network node in case the apparatus is a UE.

The apparatus may further in step M104 select a BSR quantization reference set to use for further communication. Such selecting is based on the obtained BSR table set indication.

In step M106, the apparatus transforms at least one reference buffer size to a derived buffer size. The reference buffer size is typically comprised by a BSR quantization reference table in the selected BSR quantization reference table set. For instance, the apparatus may use the stored offset equation and the obtained offset parameter to transform the at least one reference buffer size to the derived buffer size.

The apparatus may further in step M108 utilize the at last one derived buffer size to communicate with at least one other network entity. For instance, the apparatus may be a UE 100 and communicate with a network node 200 by deriving a BSR indication based on the at least one derived buffer size and indicate required UL radio resource to the network node 200 by transmitting the derived BSR indication to the network node 200. If the apparatus is a network node 200, it may receive a BSR indication, for instance from the UE 100, and transform the reference buffer size corresponding to the BSR indication to a derived buffer size. The network node 200 may then to utilize the at least one derived buffer size to allocate radio resources.

Figure 6:
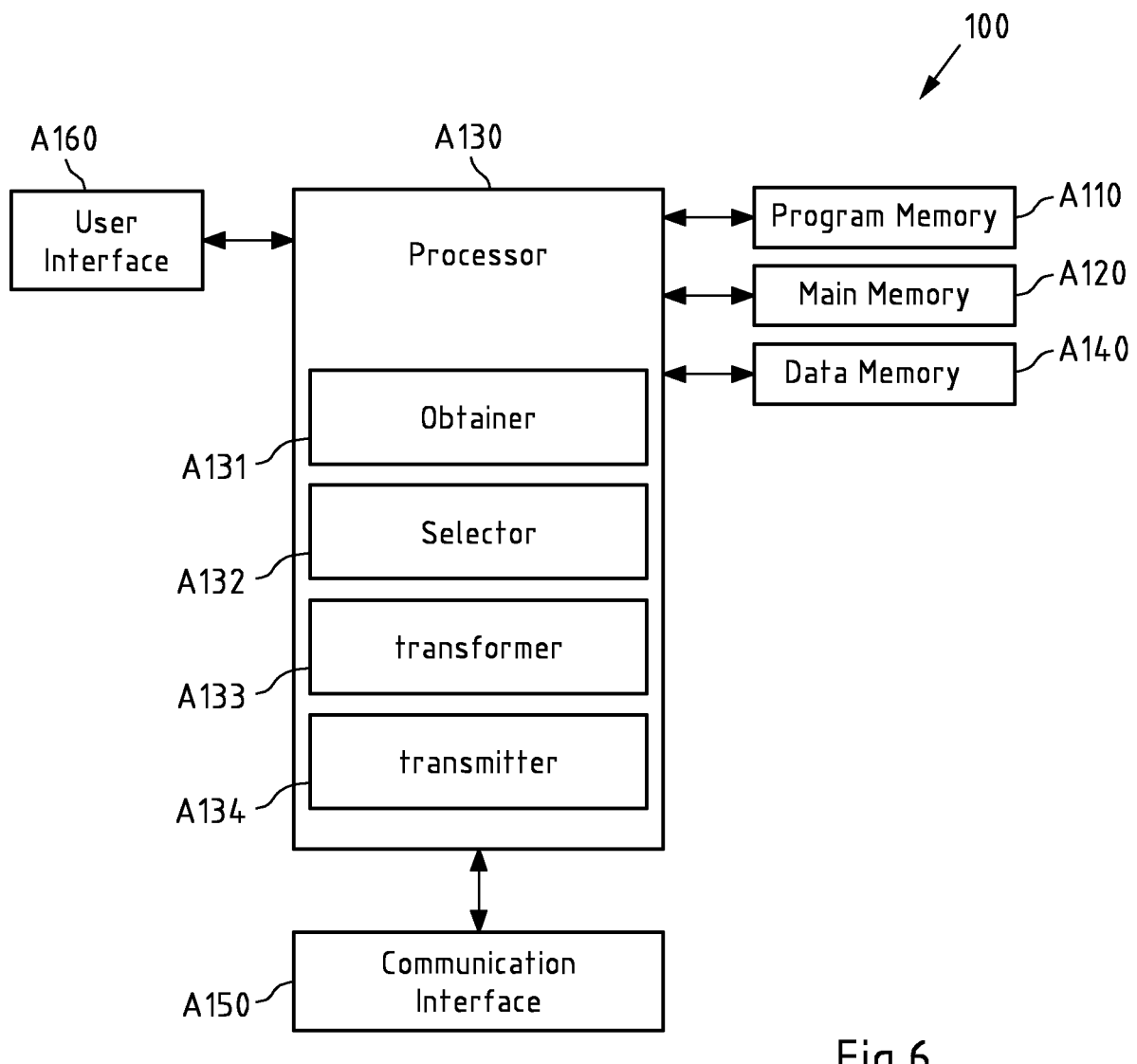
FIG. 6 a block diagram illustrating an embodiment according to the second exemplary aspect.

FIG. 6 shows an exemplary block diagram of a UE 100. The UE comprises a user interface A160, a program memory A110, a main memory A120, and a data memory A140. Further, it comprises a processor A130. The apparatus 100 may further comprise functional units A131 to A133 which respectively correspond to the steps as shown in the flow-chart of FIG. 5. The apparatus 100 may further comprise a transmitter A134 as a functional unit that allows the apparatus 100 to transmit a derived BSR indication to another network entity, e.g., to a network node 200. The transmitter A134 may for instance work together with the communication interface A150.

Figure 7:
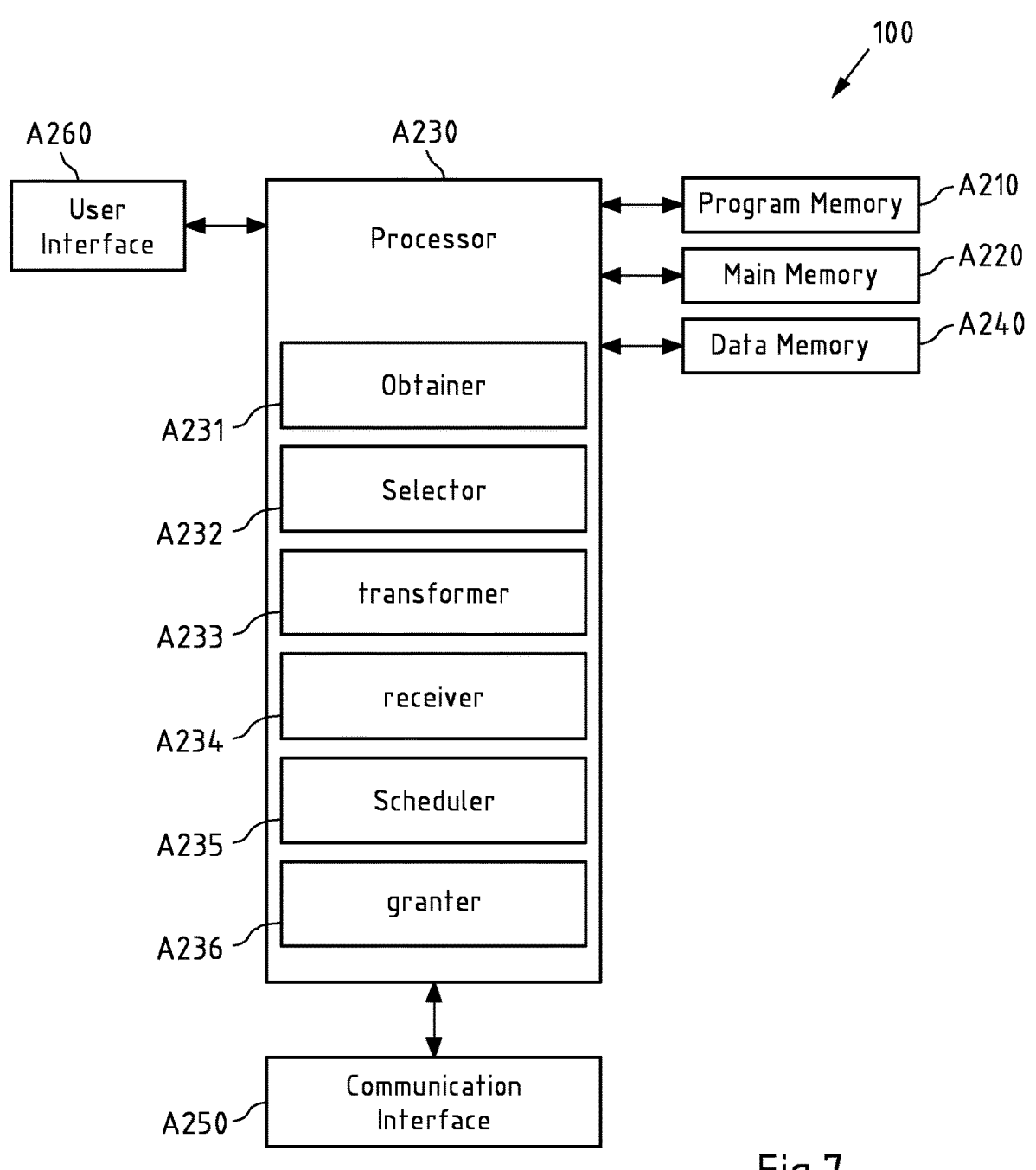
FIG. 7 a block diagram illustrating an embodiment according to the third exemplary aspect.

FIG. 7 shows an exemplary block diagram of a network node 200. The network node may comprise a user interface A260, a program memory A210, a main memory A220, and a data memory A240. Further, it comprises a processor A230. The network node 200 may further comprise functional units A231 to A233 which respectively correspond to the steps as shown in the flowchart of FIG. 5. The apparatus 200 may further comprise a receiver A234 as a functional unit that allows the apparatus 200 to receive a derived BSR indication to another network entity, e.g., from a UE 100. The receiver A234 may for instance work together with the communication interface A250. The apparatus 200 may further comprise a scheduler A235. The A235 may enable the apparatus 200 to allocate radio resources according to the received BSR indication. A further granter A236 enables to signal a grant of UL resources to a requesting apparatus, e.g., to a UE 100.

FIG. 8 is a schematic illustration of examples of tangible and non-transitory computer-readable storage media according to the present invention that may for instance be used to implement program and/or main memory A110, A120, A140, A210, A220, A240 of the apparatus 100 and/or 200 of FIGS. 6 and 7. FIG. 8 shows a flash memory 800, which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

Furthermore, at least the following embodiments shall be considered to be specifically disclosed:

EMBODIMENT 1

A method, for instance performed and/or executed by an apparatus, for instance by a UE and/or by a network node, comprising:
storing
  at least one buffer status report (BSR) quantization reference table set comprising at least one BSR quantization reference table, wherein the BSR quantization reference table comprises at least one association between a BSR indication and a respective reference buffer size and
  an offset equation,
obtaining a BSR table set indication and an offset parameter,
selecting a BSR quantization reference table set from the at least one BSR quantization reference table set based on the obtained BSR table set indication, and
transforming at least one reference buffer size of at least one of the BSR quantization reference table comprised by the selected BSR quantization reference table set to at least one derived buffer size using the offset equation and the obtained offset parameter,
utilizing the at least one derived buffer size in communication between the apparatus and another apparatus.

EMBODIMENT 2

The method according to Embodiment 1, wherein
utilizing the at least one derived buffer size comprises to
  derive a BSR indication corresponding to one of the at least one derived buffer size; and
  transmit the derived BSR indication to another network entity.

EMBODIMENT 3

The method according to any of Embodiments 1 or 2, further comprising
  receiving a BSR indication from another network entity, wherein
  transforming at least one reference buffer size comprises
    transforming a reference buffer size corresponding to the received BSR indication to a derived buffer size, and
  utilizing the at least one derived buffer size comprises to
    utilizing the derived buffer size for scheduling.

EMBODIMENT 4

The method according to any of Embodiments 1 to 3, wherein
  the at least one BSR quantization reference table set comprises at least one of
    at least two BSR quantization reference table sets;
    at least two BSR quantization reference table sets, wherein the BSR quantization reference table sets mutually differ in their buffer size distributions; or
    a BSR quantization table set and a BSR quantization reference table set.

EMBODIMENT 5

The method according to any of Embodiments 1 to 4, wherein reference buffer sizes comprised by at least one BSR quantization reference table comprised by at least one BSR quantization reference table set are distributed according to at least one of an exponential, a truncated Gaussian, a Laplacian, a Chi-Squared, a t-Student, a uniform, a triangular, an empirical distribution.

EMBODIMENT 6

The method according to any of Embodiments 1 to 5, wherein
buffer values comprised by at least one BSR quantization reference table comprised by at least one BSR quantization reference table set are distributed according to a distribution dependent on at least one reference traffic characteristic.

EMBODIMENT 7

The method according to any of Embodiments 1 to 6, wherein
at least one of the at least one BSR quantization reference table set comprise at least one of
at least two BSR quantization reference tables; or
at least two BSR quantization reference table sets, wherein the buffer sizes of the at least two BSR quantization reference tables are distributed according to a common distribution.

EMBODIMENT 8

The method according to any of Embodiments 1 to 7, wherein
at least one BSR quantization reference table set comprises at least two BSR quantization reference tables with mutually different number of associations between a respective BSR indication and a respective reference buffer size.

EMBODIMENT 9

The method according to any of Embodiments 1 to 8, wherein
at least one of the BSR table set indication, the offset parameter or the derived BSR indication is at least one of received or transmitted by at least one of Radio Resource Control (RRC), Medium Access Control (MAC), a MAC Control Element (MAC CE), a DCI or a UCI.

EMBODIMENT 10

The method according to any of Embodiments 1 to 9, wherein
the offset equation comprises at least one of
a multiplication of the reference buffer size by the offset parameter,
an addition of the offset parameter to the reference buffer size or
an application of an upper bound.

EMBODIMENT 11

The method according to any of Embodiments 1 to 10, further comprising
transforming a subset of more than one or the entirety of reference buffer sizes comprised by a given BSR quantization reference table of a BSR quantization reference table set to obtain a derived BSR table and
storing the derived BSR table.

EMBODIMENT 12

The method according to any of Embodiments 1 to 11, wherein
obtaining of at least one of a BSR table set indication or an offset parameter fulfills at least one of:
is based on at least one of an empirically derived traffic characteristic, a traffic parameter, an application type or a device type,
is useable to decide whether a currently used BSR table is unsuitable,
is based on an obtained trigger signal,
is based on an obtained trigger signal, wherein the trigger signal is at least one of received from or emitted by at least one of a user equipment (UE), a network node or a central network entity,
is based on an obtained trigger signal, wherein the trigger signal is at least one of received or transmitted by at least one of RRC, MAC CE, DCI or UCI, or
is performed periodically in one or more predefined intervals.

EMBODIMENT 13

The method according to any of Embodiments 1 to 12, wherein
the obtaining of an offset parameter comprises to derive the offset parameter based on at least one of
at least one traffic parameter,
at least one traffic parameter, wherein the traffic parameter comprises a mean frame rate or a mean data rate,
at least two traffic parameters, or
at least two traffic parameters, wherein the traffic parameters comprise a mean frame rate and a mean data rate.

EMBODIMENT 16

A first apparatus, for instance a UE, comprising respective means for performing the method of any of Embodiments 1 to 13.

EMBODIMENT 17

A first apparatus comprising at least one processor; and at least one memory including instructions that, when executed by the at least one processor, cause the apparatus at least to perform and/or control the method according any of embodiments 1 to 13.

EMBODIMENT 18

A second apparatus, for instance a network node, comprising respective means for performing the method of any of Embodiments 1 to 13.

EMBODIMENT 19

A second apparatus comprising at least one processor; and at least one memory including instructions that, when executed by the at least one processor, cause the apparatus at least to perform and/or control the method according any of embodiments 1 to 13.

EMBODIMENT 20

A computer program, the computer program when executed by a processor causing an apparatus, e.g. the apparatus according to any of the embodiments 16 to 19, to perform and/or control the actions and/or steps of the method of any of embodiments 1 to 13.

EMBODIMENT 21

A computer program product comprising a computer program according to embodiment 20.

EMBODIMENT 20

A system comprising:

at least one first apparatus according to any of the embodiments 16 or 17 and at least one second apparatus according to any of the embodiments 18 or 19.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Having the same meaning as the expression "A and/or B", the expression "at least one of A or B" may be used herein. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are (e.g., only) exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of (e.g., only) one of the enumerated features is possible. The specific combination of all subsequently enumerated features may as well be considered. Also, a plurality of (e.g., only) one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The subject-matter has been described above by means of example embodiments. It should be noted that there are alternative ways and variations which are obvious to a skilled person in the art and can be implemented without deviating from the scope of the appended claims.

LIST OF ABBREVIATIONS

AR Augmented reality
BSR Buffer Status Report
DL Downlink
fps Frames per second
gNB 5G Node B, base station
KPI Key performance indicator
LCG Logical channel group
MR Mixed reality
NR New Radio
PDB Packet delay budget
PDCCH Physical downlink control channel
PDSCH Physical downlink shared channel
Qos Quality of service
RRC Radio Resource Control
SI Study Item
SID Study Item Description
UE User Equipment
UL Uplink
VR Virtual reality
WI Work Item
XR Extended reality

The invention claimed is:

1. An apparatus comprising:

at least one processor; and at least one memory including instructions that, when executed by the at least one processor, cause the apparatus at least to:

store at least one buffer status report (BSR) quantization reference table set comprising at least one BSR quantization reference table, wherein the BSR quantization reference table comprises at least one association between a BSR indication and a respective reference buffer size and an offset equation, the at least one BSR quantization reference table set comprises two BSR quantization reference table sets, wherein the two BSR quantization reference table sets mutually differ in their buffer size distributions, and wherein the offset equation comprises a multiplication of the reference buffer size by an offset parameter, an addition of the offset parameter to the reference buffer size, and an application of an upper bound;

obtain a BSR table set indication and an offset parameter;

select a BSR quantization reference table set from the at least one BSR quantization reference table set based on at least one of the obtained BSR table set indication or the offset parameter;

transform at least one reference buffer size of at least one of the BSR quantization reference table set comprised by the selected BSR quantization reference table set to at least one derived buffer size using the offset equation and the obtained offset parameter;

utilize the at least one derived buffer size in communication between the apparatus and another apparatus;

derive a BSR indication corresponding to one of the at least one derived buffer size; and transmit the derived BSR indication to another network entity.

2. The apparatus according to claim 1, the at least one memory including further instructions that, when executed by the at least one processor, cause the apparatus further to:

receive a BSR indication from another network entity, wherein transforming at least one reference buffer size comprises;

transform a reference buffer size corresponding to the received BSR indication to a derived buffer size; and utilize the at least one derived buffer size for scheduling.

3. The apparatus according to claim 2, wherein the reference buffer size comprised by the at least one BSR quantization reference table is distributed according to the following: an exponential, a truncated Gaussian, a Laplacian, a Chi-Squared, a t-Student, a uniform, a triangular, and an empirical distribution.

4. The apparatus according to claim 2, wherein buffer values comprised by the at least one BSR quantization reference table are distributed according to a distribution dependent on at least one reference traffic characteristic.

5. The apparatus according to claim 2, wherein the derived BSR indication is transmitted by at least one of Radio Resource Control (RRC), Medium Access Control (MAC), a MAC Control Element (MAC CE), a DCI or a UCI.

6. The apparatus according to claim 1, the at least one memory further including instructions that, when executed by the at least one processor, cause the apparatus further to:

transform a subset of more than one or the entirety of reference buffer sizes comprised by a given BSR quantization reference table of a BSR quantization reference table set to obtain a derived BSR table; and store the derived BSR table.

7. The apparatus according to any of claim 6, wherein the obtaining of at least one of a BSR table set indication or an offset parameter fulfills the following:

is based on at least one of an empirically derived traffic characteristic, a traffic parameter, an application type or a device type;

is useable to decide whether a currently used BSR table is unsuitable;

is based on an obtained trigger signal;

is based on an obtained trigger signal, wherein the trigger signal is at least one of received from or emitted by at least one of a user equipment (UE), a network node or a central network entity;

is based on an obtained trigger signal, wherein the trigger signal is at least one of received or transmitted by at least one of RRC, MAC CE, DCI or UCI; and is performed periodically in one or more predefined intervals.

8. The apparatus according to any of claim 6, wherein the obtaining of an offset parameter to derive the offset parameter is based on the following:

at least one traffic parameter;

at least one traffic parameter, wherein the traffic parameter comprises a mean frame rate or a mean data rate;

at least two traffic parameters; and at least two traffic parameters, wherein the traffic parameters comprise a mean frame rate and a mean data rate.

9. A system comprising:

an apparatus;

a processor; and a memory comprising computer-executable instructions that, when executed by the processor, cause the processor to perform the following operations:

store at least one buffer status report (BSR) quantization reference table set comprising at least one BSR quantization reference table, wherein the BSR quantization reference table comprises at least one association between a BSR indication and a respective reference buffer size and an offset equation, the at least one BSR quantization reference table set comprises two BSR quantization reference table sets, wherein the two BSR quantization reference table sets mutually differ in their buffer size distributions, and wherein the offset equation comprises a multiplication of the reference buffer size by an offset parameter, an addition of the offset parameter to the reference buffer size, and an application of an upper bound;

obtain a BSR table set indication and an offset parameter;

select a BSR quantization reference table set from the at least one BSR quantization reference table set based on at least one of the obtained BSR table set indication or the offset parameter;

transform at least one reference buffer size of at least one of the BSR quantization reference table set comprised by the selected BSR quantization reference table set to at least one derived buffer size using the offset equation and the obtained offset parameter;

utilize the at least one derived buffer size in communication between the apparatus and another apparatus;

derive a BSR indication corresponding to one of the at least one derived buffer size; and transmit the derived BSR indication to another network entity.

10. The system of claim 9, wherein the computer-executable instructions further cause the processor to perform the following operations:

receive a BSR indication from another network entity, wherein transforming at least one reference buffer size comprises:

transform a reference buffer size corresponding to the received BSR indication to a derived buffer size; and utilize the at least one derived buffer size for scheduling.

11. The system of claim 10, wherein the reference buffer size comprised by the at least one BSR quantization reference table is distributed according to the following: an exponential, a truncated Gaussian, a Laplacian, a Chi-Squared, a t-Student, a uniform, a triangular, and an empirical distribution.

12. The system of claim 11, wherein buffer values comprised by the at least one BSR quantization reference table are distributed according to a distribution dependent on at least one reference traffic characteristic.

13. The system of claim 11, wherein the derived BSR indication is transmitted by at least one of Radio Resource Control (RRC), Medium Access Control (MAC), a MAC Control Element (MAC CE), a DCI or a UCI.

14. The system of claim 9, wherein the computer-executable instructions further cause the processor to perform the following operations:

transform a subset of more than one or the entirety of reference buffer sizes comprised by a given BSR quantization reference table of a BSR quantization reference table set to obtain a derived BSR table; and store the derived BSR table.

15. The system of claim 14, wherein the obtaining of at least one of a BSR table set indication or an offset parameter fulfills the following:

is based on at least one of an empirically derived traffic characteristic, a traffic parameter, an application type or a device type;

is useable to decide whether a currently used BSR table is unsuitable;

is based on an obtained trigger signal;

is based on an obtained trigger signal, wherein the trigger signal is at least one of received from or emitted by at least one of a user equipment (UE), a network node or a central network entity;

is based on an obtained trigger signal, wherein the trigger signal is at least one of received or transmitted by at least one of RRC, MAC CE, DCI or UCI; and is performed periodically in one or more predefined intervals.

16. The system of claim 14, wherein the obtaining of an offset parameter to derive the offset parameter is based on the following:

at least one traffic parameter;

at least one traffic parameter, wherein the traffic parameter comprises a mean frame rate or a mean data rate;

at least two traffic parameters; and at least two traffic parameters, wherein the traffic parameters comprise a mean frame rate and a mean data rate.

17. A method comprising:

storing at least one buffer status report (BSR) quantization reference table set comprising at least one BSR quantization reference table, wherein the BSR quantization reference table comprises at least one association between a BSR indication and a respective reference buffer size and an offset equation, the at least one BSR quantization reference table set comprises two BSR quantization reference table sets, wherein the two BSR quantization reference table sets mutually differ in their buffer size distributions, and wherein the offset equation comprises a multiplication of the reference buffer size by an offset parameter, an addition of the offset parameter to the reference buffer size, and an application of an upper bound;

obtaining a BSR table set indication and an offset parameter;

selecting a BSR quantization reference table set from the at least one BSR quantization reference table set based on at least one of the obtained BSR table set indication or the offset parameter;

transforming at least one reference buffer size of at least one of the BSR quantization reference table comprised by the selected BSR quantization reference table set to at least one derived buffer size using the offset equation and the obtained offset parameter;

utilizing the at least one derived buffer size in communication between two apparatus;

deriving a BSR indication corresponding to one of the at least one derived buffer size; and transmitting the derived BSR indication to another network entity.

18. The method of claim 17, further comprising:

receiving a BSR indication from another network entity, wherein transforming at least one reference buffer size comprises:

transforming a reference buffer size corresponding to the received BSR indication to a derived buffer size; and utilizing the at least one derived buffer size for scheduling.

19. The method of claim 18, wherein the reference buffer size comprised by the at least one BSR quantization reference table is distributed according to the following: an exponential, a truncated Gaussian, a Laplacian, a Chi-Squared, a t-Student, a uniform, a triangular, and an empirical distribution.

20. The method of claim 19, wherein buffer values comprised by the at least one BSR quantization reference table are distributed according to a distribution dependent on at least one reference traffic characteristic.

* * * * *